Dec. 22, 1953   A. W. GARDES   2,663,586
FLANGE CONNECTING MEANS
Filed Aug. 24, 1950
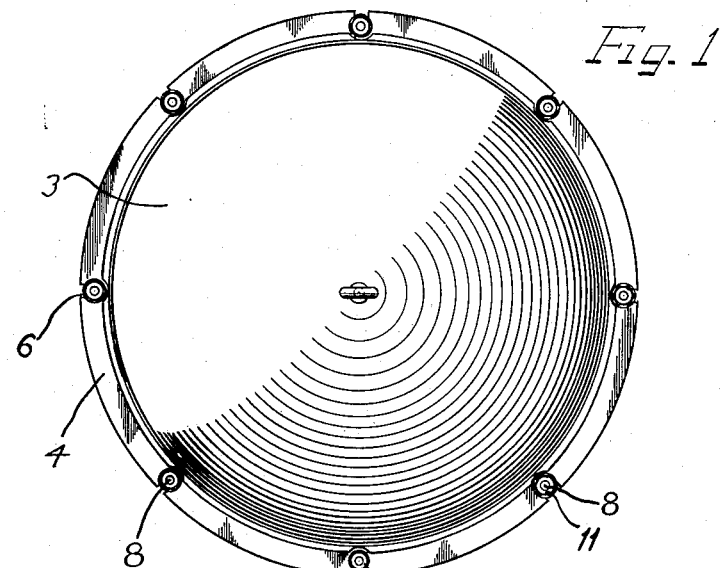
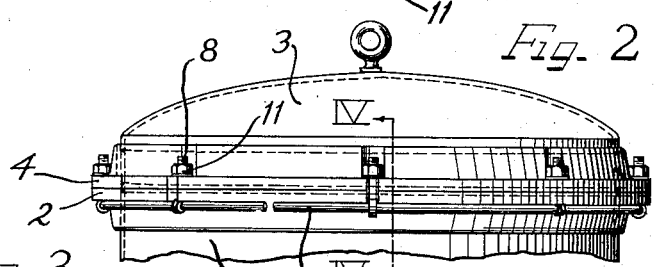
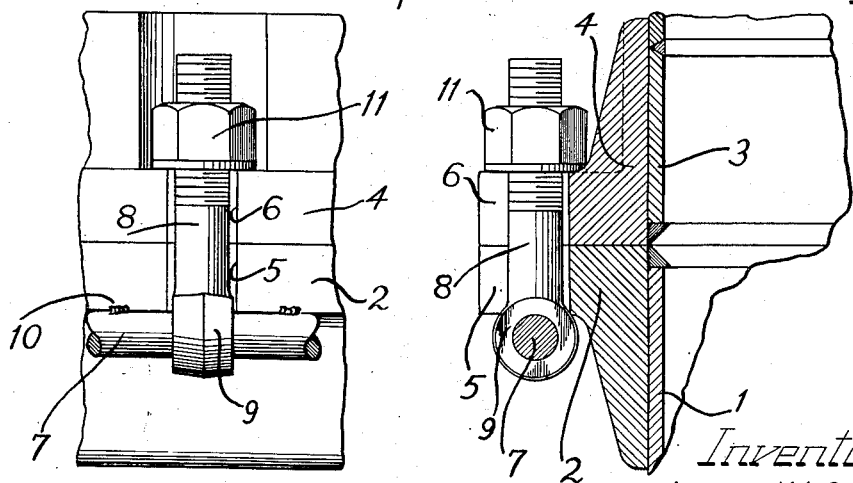
Inventor
ALFRED W. GARDES Patented Dec. 22, 1953

2,663,586

UNITED STATES PATENT OFFICE 2,663,586

FLANGE CONNECTING MEANS

Alfred W. Gardes, Detroit, Mich., assignor to Honan-Crane Corporation, Lebanon, Ind., a corporation of Indiana Application August 24, 1950, Serial No. 181,299

2 Claims. (Cl. 292—256.75)

1

This invention relates to improvements in flange connecting means, and more particularly to a connecting assembly embodying pivotal bolts for movement into and out of mating or aligned notches in confronting flanges to secure the flanges together, the invention being highly desirable for the connection of covers on containers, or for the connection of other flanged members together through the confronting flanges on the members, although the invention may have other uses and purposes as will be apparent to one skilled in the art.

In the past, where pivotal bolts have been used to connect flanged members together, and especially where covers were so held on pressure containers, it has been customary to weld individual U-shaped brackets, or cast confronting lugs on one of the flanges, and pivot a bolt in such bracket or between a pair of lugs. Such procedure was objectionably difficult and expensive in properly aligning the bolts, especially in some installations where thirty-six or more bolts are used to attach a single cover to a container.

With the foregoing in mind, it is an important object of this invention to provide a flange connecting assembly including a carrier element and bolts pivoted thereto, which assembly may be mounted in proper position on one face of a flange, with all bolts properly aligned for pivotal movement into and out of the notches in the edge of the flange.

It is another object of this invention to provide a flange connecting assembly including a carrier element upon which eye bolts are strung or threaded for pivotal movement relatively thereto, which carrier element may be secured to the face of a flange, with the eye of a bolt projecting partially into a notch in the circumference of the flange to prevent lateral displacement of the respective bolts.

Still another object of the invention resides in the provision of a flange connecting means wherein a pair of flanges having aligned notches in their outer edges are joined together by pivotal bolts, including a carrier element secured to a face of one of the flanges, between notches by spot welding or in an equivalent manner, and eye bolts are threaded or strung on that carrier element for pivotal movement relatively thereto into and out of the mating notches in the flanges.

It is also a feature of this invention to provide a flange connecting assembly which may be attached to the face of a flange as an integral unit, including all necessary bolts for joining a pair of confronting flanges, the bolts being readily aligned, and the entire installation being extremely economical.

While some of the salient features, characteristics and advantages of the instant invention have been above pointed out, others will become apparent from the following disclosures, taken in conjunction with the accompanying drawing, in which—

Figure 1 is a top plan view of a structure embodying flanges connected by an assembly embodying improvements of the instant invention;

Figure 2 is a fragmentary side elevational view of the structure of Fig. 1;

Figure 3 is a fragmentary enlargement of a portion of Fig. 2, showing the mounting of a bolt and carrier element in elevation; and Figure 4 is a fragmentary enlarged vertical sectional view taken substantially as indicated by the line IV—IV of Fig. 2, looking in the direction of the arrows.

As shown on the drawings:

The illustrated embodiment of the instant invention is shown associated with a container and cover therefor, for purposes of convenience and clarity, although it is to be understood that the invention is equally useful for connecting substantially any pair of confronting flanges.

In the illustrated showing, there is a container 1 having a circumferential flange 2 secured around the mouth thereof. A cover 3 having a similar flange 4 secured around the lower end thereof in position to be disposed in confronting relationship with the flange 2 may be attached to the container by the instant invention. Any suitable number of bolts may be utilized to hold the cover on the container, and in the illustrated instance eight such bolts are disclosed by way of example only.

From the showings especially in Figs. 3 and 4, it will be noted that the container flange 2 is provided with a notch 5 in the circumferential edge thereof for each bolt, while the cover flange 4 is provided with similar notches 6. When the cover is placed on the container, of course, the notches 6 are aligned or disposed in mating relationship with the notches 5 in the container flange so that each set of notches will accommodate the shank of a securing bolt.

The connecting means may be attached obviously to the outer face of either the flange 2 or the flange 4, and in the illustrated showing a set of these means have been connected to the outer face (as distinguished from the confronting face) of the flange 2 on the container. A carrier element 7 in the form of an open-ended ring, since the container is shown cylindrical, is provided and on this element a plurality of eye bolts 8 are threaded or strung by passing the eye of the respective bolts over the ring. The bolts are disposed loosely on the ring so as to be pivotal relatively thereto, but the eye 9 of each bolt is preferably of such size as to project partially within the adjacent notch 5 as seen clearly in Figs. 3 and 4 so as to prevent lateral displacement of each bolt relatively to the carrier element or ring 7.

With reference now to Fig. 3 it will be seen that the ring is attached to the outer face of the respective flange by spot welding as indicated at 10 or by securing clips or lugs, or in any other suitable manner, the points of attachment obviously being between notches. Thus, each bolt is positively located with ease and dispatch at the respective mating notches and cannot become dislocated or displaced from that position, and yet the bolt is free to pivot up and down into and out of the respective mating notches.

In order to attach the cover to the container 1, it is a simple expedient to place it in position with the notches 6 mating with those with the notches 5, pivot each respective bolt into position in the mating notches, and place a nut 11 over the exposed end of the bolt.

From the foregoing, it will be apparent that I have provided a simple flange connecting means assembly which may be prefabricated prior to attachment to the face of a flanged member. The assembly may then be readily placed into position and attached with a minimum of effort, there being no necessity whatever to rebore lugs or brackets, reshape pivot pins, or go to all the trouble required by heretofore known methods in order to properly align the bolts. Further, the assembly is highly durable, and extremely economical to manufacture, assemble, and install.

It will be understood that modifications and variations may be effected without departing from the scope of the novel concepts of the present invention.

I claim as my invention:

1. In a container assembly, a container, an outstanding flange around the mouth of said container, a cover, an outstanding flange on said cover for confronting relationship with the container flange, said flanges having aligned notches in their outer edges to receive bolt shanks, an open-ended ring welded to the outer face of one of said flanges at points between notches, and an eye-bolt for each set of notches strung on said ring for pivotal movement into and out of the respective set of notches, nuts for said bolts to clamp said flanges together when the bolt shanks are in the respective notches, the part forming the eye of each said bolt projecting into the adjacent notch at all times to prevent lateral displacement of the bolt.

2. Connecting means for a pair of annular flanges having notches extending inwardly from the circumferential edges for receiving the shanks of bolts, including an open-ended ring-like element permanently and fixedly secured to the outer side of one of the flanges at points between notches, and eye-bolts on said ring in the region of the notches, nuts for said bolts, said ring functioning as a pivot pin for said bolts and carrying the respective bolt end load when the nuts are tightened, all bolts and nuts being within the bounding edges of the flanges when holding the flanges connected.

ALFRED W. GARDES.

References Cited in the file of this patent

UNITED STATES PATENTS

| Number | Name | Date |
|---|---|---|
| 1,749,122 | Beasley | Mar. 4, 1930 |
| 1,810,066 | Bakken | June 16, 1931 |

FOREIGN PATENTS

| Number | Country | Date |
|---|---|---|
| 369,859 | Germany | Feb. 23, 1923 |
| 437,216 | France | Feb. 12, 1912 |